US006705654B2

(12) United States Patent
Slauf

(10) Patent No.: US 6,705,654 B2
(45) Date of Patent: Mar. 16, 2004

(54) FRISBEE GOLF DISC RETRIEVER AND MORE

(75) Inventor: L. Johnny Slauf, 436 S. 77th E. Ave., Tulsa, OK (US) 74112

(73) Assignee: L. Johnny Slauf, Tulsa, OK (US)

( * ) Notice: Subject to any disclaimer, the term of this patent is extended or adjusted under 35 U.S.C. 154(b) by 0 days.

(21) Appl. No.: 10/027,463

(22) Filed: Dec. 20, 2001

(65) Prior Publication Data

US 2003/0122390 A1 Jul. 3, 2003

(51) Int. Cl.[7] .................................................. B25J 1/00

(52) U.S. Cl. ....................... 294/24; 294/19.1; 294/65.5; 7/167

(58) Field of Search .............................. 294/19.1, 19.2, 294/24, 1.1, 65.5, 51, 26; 15/105, 144.1, 144.2, 144.3; 135/74, 143; 7/167, 901; 403/220, 225, 291

(56) References Cited

U.S. PATENT DOCUMENTS

| | | | | | |
|---|---|---|---|---|---|
| 3,384,408 | A | * | 5/1968 | Furzey | 294/65.5 |
| 3,669,133 | A | * | 6/1972 | Hyman | 135/74 |
| 4,257,635 | A | * | 3/1981 | Mainprice | 294/1.4 |
| 4,776,361 | A | * | 10/1988 | Staton | 135/65 |
| 5,487,576 | A | * | 1/1996 | DuVivier | 294/19.1 |
| 5,560,975 | A | * | 10/1996 | Casper | 428/99 |
| 5,601,322 | A | * | 2/1997 | Forest | 294/3 |
| 5,775,021 | A | * | 7/1998 | Weiss | 42/95 |
| 5,901,994 | A | * | 5/1999 | Riddle et al. | 294/19.1 |
| 6,048,073 | A | * | 4/2000 | Shiao | 362/120 |
| 6,065,787 | A | * | 5/2000 | Jarosch | 294/19.1 |
| 6,293,601 | B1 | * | 9/2001 | Johnson | 294/26 |
| 6,422,622 | B1 | * | 7/2002 | Bernard | 294/24 |

* cited by examiner

*Primary Examiner*—Dean J. Kramer

(57) ABSTRACT

The invention known as the "Frisbee golf disc retriever and more " is a fold-up type of extension rod being comprised of several tubular sections having slip-joint type connections which are pulled together by an elastic type of cord being laced through the center of all the tubular sections and being anchored in a partially tensioned state at each end piece section of tubing by means of a knot or any feasible type of cord end device, a handle, a double ended coupler device which also houses a tie strap device, and a nail-head type hook device for retrieving Frisbee golf discs and the like. Other readily attachable tools include a J-hook device, a net device, a magnetic pick-up device, a feather duster device, an ornament hanger device.

2 Claims, 3 Drawing Sheets

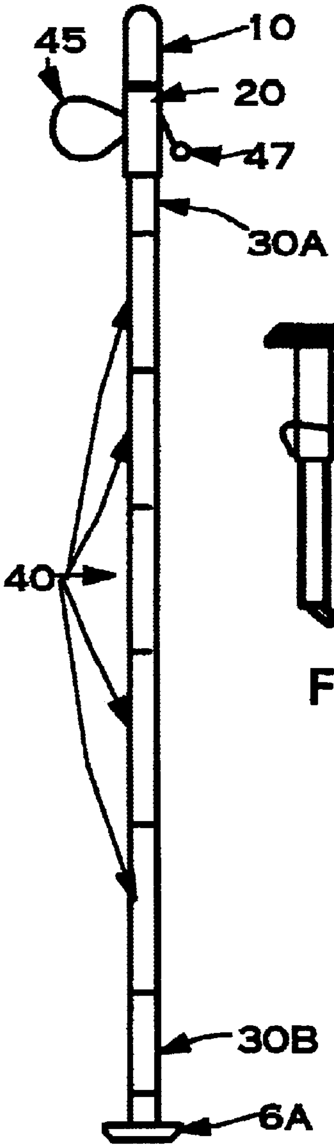
FIG. 1
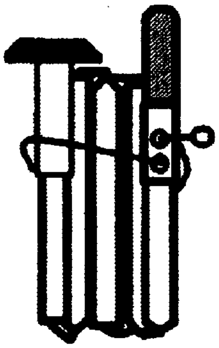
FIG. 2
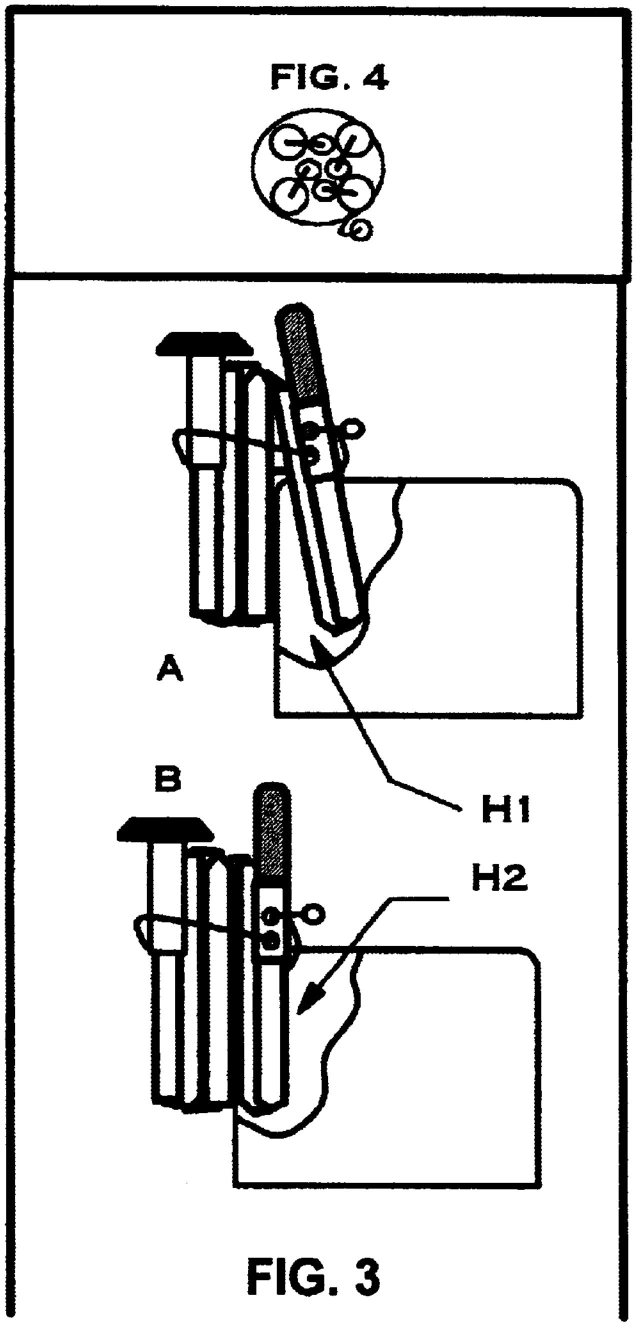
FIG. 4
FIG. 3

FRISBEE GOLF DISC RETRIEVER AND MORE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION (1) Field of Invention

The present invention relates to collapsible fold up type retriever devices with removable handle and removable tools, accompanied by a built in removable coupler for connecting multiple units when needed for retrieving items or valuables from long reaches, more particularly, a Frisbee or Disc Golf disc retriever for retrieving Frisbees or Disc Golf discs used in the game or sport known as Frisbee Golf AKA Disc Golf, by means of a removable nailhead type of hook device for retrieving said Frisbees or Disc Golf discs that may fall victim to course hazards that are out of arms reach, such as bodies of water e.g. streams, creeks, ponds, and the like or other hazards such as trees, or bushes and the like, that are randomly located through out the course or playing field on which the game or sport is played. The said invention is also intended to be used for a variety of jobs, tasks, or functions that can be accomplished with a variety of readily attachable tools such as, a removable net device tool for retrieving fish from bodies of water, or catching birds or insects such as butterflies, etc. Other types of readily attachable tools could be a removable feather duster device for those real high ceiling fans or corners, a removable magnetic tool retriever device to be used by diesel and big rig mechanics where tools can fall far out of reach of any existing magnetic pick up tool devices, a removable string light hanger tool for installing and removing string type lights or the like on high tree branches or other suitable places not rendering a predetermined receiving device or apparatus. Even as some of these mentioned jobs, tasks, or functions the unit could be used for, there will always be those cases where the unit is too short to accomplish the task at hand. Enter the built in removable double ended coupler which makes it possible to attach another Frisbee golf disc retriever and more unit for additional length when needed.

For example, those extra high trees or the like type of hazards. This is accomplished by means of removing the handle from the end of the double ended coupler of one unit and removing the hook device or other type of tool or apparatus from the end piece section of the second unit and attaching the two units together by connecting the distal end section piece of one unit to the distal end of the double ended coupler of the other unit, when finished retrieving the Frisbee golf disc or when you're done using the Frisbee golf disc retriever and more unit for whatever job the unit was used for, the unit can then be collapsed to a compact state by means of separating the slip-joint connections between the end piece sections and the body sections by a twist and pull action and folding all the sections together and securing the unit in it's collapsed state by means of said friction type tie strap which is housed at the double ended coupler.

(2) Description of Related Art

Not applicable

BRIEF SUMMARY OF THE INVENTION

A fold up type retriever device used for retrieving disc golf discs or Frisbees or the like that are used in the game or sport known as "Frisbee Golf " or "Disc Golf" from hazards such as bodies of water or trees located throughout the course on which the game or sport is played, by means of an elongated pole device comprised of a handle with an external knurl for grip and being connected threadedly to a double ended coupler device which is connected threadedly to either of two end section tubular pieces at each distal end of a plurality of tubular sections which are connected by means of slip-joint connections formed by each tubular section having one end turned down and the opposite end bored out, then all the sections are pulled together by means of an elastic bungee cord laced through all of the tubular sections and anchored at each end by means of a knot or cord end device at each end of the cord then pulled to lock into a shallow bore at the distal end of each of the end section pieces, then having one of several removable retriever devices connected threadedly to the distal end of the of either end section piece opposite the handle, such as a removable nail head type hook device, a removable magnetic tool retriever device, a removable net device, a removable feather duster device, a removable J-hook device, a removable string-light hanger device, where all of these devices have the same connecting end as said double ended coupler device, which can also be used to couple multiple units together for extra reach when needed such as for those extra high trees. Then the device can fold up to a compact state by means of pulling the slip joint connections apart and fold them over until all the sections are together where they can be held together by means of an elastic tie strap device housed at the coupler device. Then when needed just loosen the tie strap by spreading the handle away from the other sections then unloose the strap from around the unit, grab the handle and let the rest go to automatically pull together forming a nice long retrieving pole. When you're done, just fold it back up, secure the strap and slide back onto your bag until next time.

BRIEF DESCRIPTION OF THE SEVERAL VIEWS OF THE DRAWINGS

FIG. 1 Shows the invention in the elongated state with the disc golf disc retriever nail head-type of hook on the distal end, while the primal has the handle attached to the double ended coupler, pointing out the tie strap 45 being housed at the double ended coupler.

FIG. 2 Shows is the side view of the invention in the compact state being secured in the compact by the tie strap 45.

FIGS. 3A, B Shows how the invention attaches to a disc golf bag or the like H1, H2.

FIG. 4 Is an end view of the invention in the compact state.

DESCRIPTION OF THE PREFERRED EMBODIMENT

Figures 5, 6:
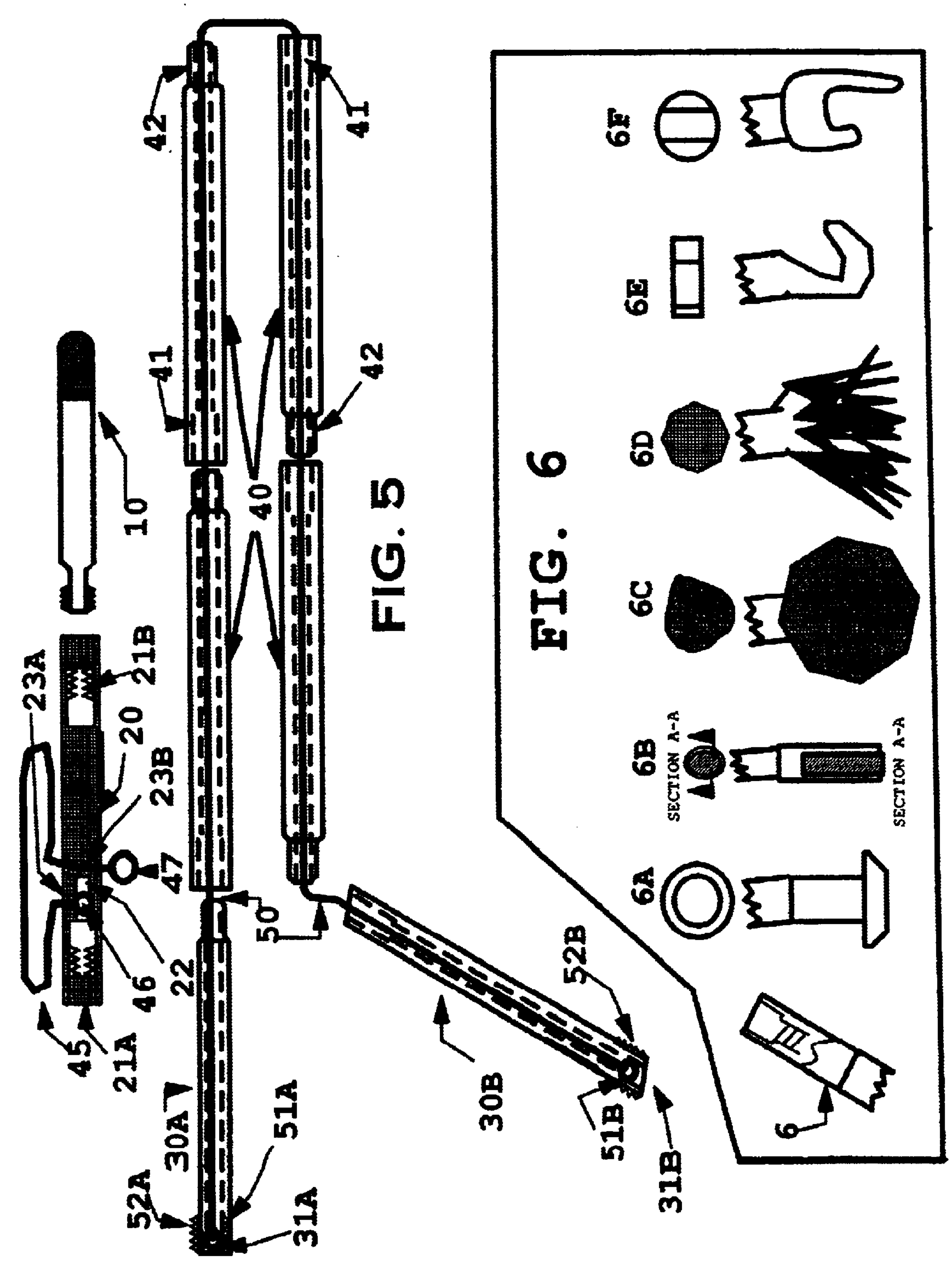
FIG. 5 Is an exploded view of the assembly of the invention
FIG. 6 Shows the different types of readily attachable tools or devices to be used with the invention described as follows: 6A is a nailhead-type of hook device for frisbee golf discs and the like, 6B is a magnetic tool pick-up device, 6C is a net device, 6D is feather duster device, 6E is a J-hook device, and 6F is a string light hanger device.
Figures 7, 7A, 7B, 7C, 7D, 7E, 7F, 7G, 7H:
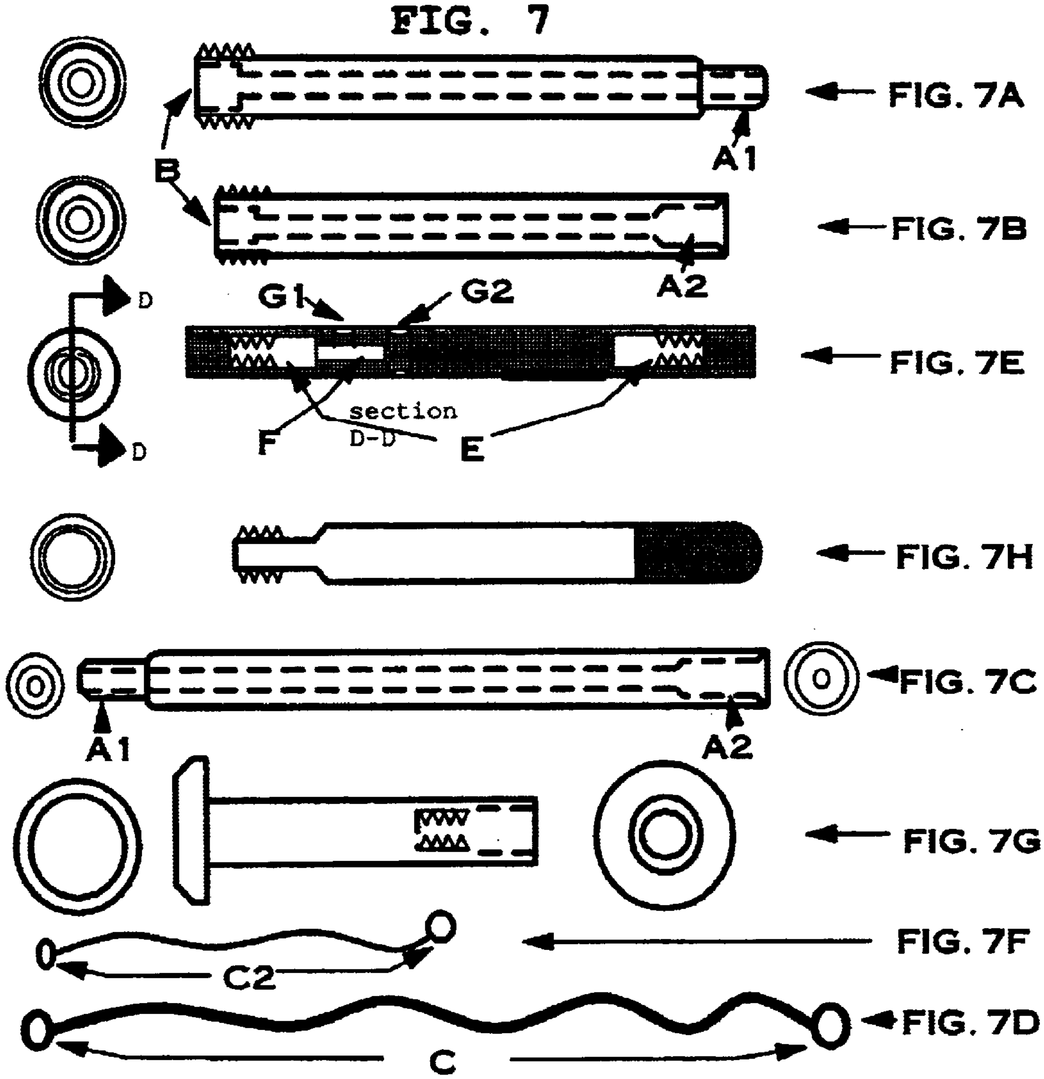
FIG. 7 Shows independent side and end views of the different sections of the invention as follows.
FIG. 7A One of the two end section pieces, this one having a male gender slip-joint connection A1 on one end while threaded externally and bored at the opposite end B.
FIG. 7B The second of the two end section pieces, this one having a female gender slip-joint connection A2 on one end then threaded externally and bored at the opposite end B.
FIG. 7C One of the several body sections of the unit having the male slip-joint connection A1 at one end and the female slip-joint connection A2 at the opposite end.
FIG. 7D The elastic type cord that laces through all of the sections and anchors at each end my means of a knot or feasible cord end C.
FIG. 7E The double ended coupler being bored and counter bored then threaded in the counter bore E at each end with one end having a second counter bore F that intersects with one of two holes G1 being perpendicular to the bores but parallel to each other, then the other hole G2 does not intersect.
FIG. 7F The elastic type cord used for the tie strap that is attached to the double ended coupler.
FIG. 7G Shows the nail-head type hook being bored and counter bored and threaded on one end so to attach to either end section piece, then having the distal end with a short larger diameter portion creating a 360 degree hook.
FIG. 7H The handle having a knurled section for grip on the distal end and being machined down and threaded on the connecting end.

The body of the invention as shown in FIG. 1 is made up of several body sections 40 having mating gender slip-joint ends 41, 42 being machine or formed to provide a rigid connection between each body section and the end piece sections 30A, 30B while said end piece sections are machined at their distal ends to have a shallow bore 31A, 31B for means of anchoring the elastic type cord 50 by means of a knot or cord end device 51A, 51B that would rest inside said shallow bore which is accompanied by external threads 52A, 52B allowing for attachment to the double ended coupler device 20 at either end of the body by means of mating threads machined or formed inside a counter bore located at each end of said double ended coupler device 21A–21B allowing for attachment to another body unit of said invention or the handle device 10 attached threadedly to said double ended coupler on the distal end opposite said body unit thus forming a single unit of said invention having a nail-head type hook device 6A or other type of retriever device that can be readily attached threadedly to the distal end of the body of the unit opposite said double ended coupler, such as 6A is the aforementioned nail-head type hook device that provides an equal hooking action around the circumference of the distal end, 6B is a magnetic pick-up device having a round or square bar shape rare earth magnet with a pick-up capacity of at least 5 pounds and being housed inside a plastic or nylon alloy type of sleeve, 6C is a net device for cleaning debris from swimming pools or deep fish tanks or the like or for retrieving fish from the water, or catching birds or butterflies or the like, 6D is a duster device made from feathers or any other natural or synthetic material. 6E is a standard J-hook type of retriever device. 6F is an ornament tool for hanging or removing string lights or the like in tall trees or any high place the ornaments may be hung. The said invention can be transformed into a compact state FIG. 2 by means of separating the slip-joint connections by a twist and pull action and folding each section over until all the body sections of the invention are grouped together forming a compact bundle which is held in a compact state by means of the elastic type tie strap 45 which is housed at said double ended coupler by means of said tie strap being laced into a second counter bore 22 located in one end of said double end coupler then laced out through an intersecting hole 23A drilled through only one wall of said second counter bore and said tie strap is anchored in the bottom of said second counter bore by means of a knot or cord end device 46, then said tie strap is laced through a second hole 23B drilled through the side of said double ended coupler perpendicular to said second counter bore but not intersecting with said second counter bore, then said tie strap is knotted on the end or has a cord end device attached to it 47 so to keep the tie strap from pulling out. The second drilled hole is the same size or slightly smaller than said tie strap thus creating a drag friction type of grip on said tie strap which assembles to said double ended coupler in such a way that it creates a cinchable or closing loop 45 on the out side of said coupler, then the closable loop is stretched around all of the components of the invention in it's collapsed or compact state and the loop is pulled or cinched closed by means of pulling tightly on the distal end of said tie strap 47. The invention can then be attached to the side of a disc golf bag or the like FIGS. 3A,B by means of slightly spreading the compact tubes apart and saddling them over the edge of the wall of the bag H1 and pushing the invention down onto the golf bag wall which is now being squeezed between the tight bundle of tubing H2.

What is claimed is:

1. A tubular fold up type of extension retriever device comprising;

a:) several tubular body sections, each having a male slip-joint connection machined or formed on one end and a mating female slip-joint connection machined or formed at the opposite and so that the sections can be connected together at the mating ends to create a body section of an extension pole unit; and b:) two end piece sections, to be connected to the distal ends of the body section, each one having a different gender slip-joint connection at one end, then both having outside diameter threads on their distal end, being accompanied by a shallow bore in the threaded end; and c:) an elastic type of cord laced through the center of all of the body sections and both end piece sections and being anchored in a state of partial tension at the distal ends of each end piece section by means of a knot in the cord or any feasible cord end device that would rest inside the shallow bores of the end piece sections; and d:) a removable handle having one end turned down and threaded on the outside diameter for attaching to the unit, while the other end is knurled for grip; and e:) an elastic type cord to be used as a friction type tie strap; and f:) a removable double ended coupler which also houses the friction type tie strap, wherein the coupler having each end being bored then counter bored and threaded in the counter bore so as to attach to either of the end section pieces or to the handle or to couple another unit, where one end of said double ended coupler has a second counter bore which intersects with a perpendicular hole drilled through only one wall of the second counter bore to house one end of the elastic tie strap by means of a knot at the distal end while the primal end is laced into the end of the second counter bore and out through the intersecting hole and pulled tight to secure the knotted end into the second counter bore, then the tie strap is laced through a second drilled hole being perpendicular to the second counter bore and parallel to the first drilled hole but not intersecting with the second counter bore, said tie strap then having a knot or a cord end device at the distal end preventing it from pulling back through, this makes a closable loop in the strap on one side of the double ended coupler that is pulled over the end of the unit in it's compact state and pulled tightly closed securing the unit compact, and g:) a removable nail-head type hook device especially designed to promote the same hooking action around the full circumference of the nail-head type end to snag the lip of a Frisbee or a Disc Golf disc, having a bore and a threaded counter bore at the opposite end for attaching to an end piece section of the unit.

2. The retriever device of claim 1, further comprising at least one from the group consisting of:

a) a readily attachable net device type attachment;

b) a readily attachable feather type duster tool;

c) a readily attachable strong magnet pick-up tool;

d) a readily attachable hanger tool; or e) a readily attachable J-hook device.

* * * * *